(12) United States Patent
Kimmel et al.

(10) Patent No.: US 8,880,787 B1
(45) Date of Patent: Nov. 4, 2014

(54) EXTENT METADATA UPDATE LOGGING AND CHECKPOINTING

(71) Applicant: NetApp, Inc., Sunnyvale, CA (US)

(72) Inventors: Jeffrey S. Kimmel, Chapel Hill, NC (US); T. Byron Rakitzis, Seattle, WA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/160,259

(22) Filed: Jan. 21, 2014

Related U.S. Application Data

(63) Continuation of application No. 14/158,689, filed on Jan. 17, 2014.

(51) Int. Cl.
*G06F 12/00* (2006.01)
*G06F 12/02* (2006.01)

(52) U.S. Cl.
CPC .................................. *G06F 12/0246* (2013.01)
USPC ............................ 711/103; 711/154; 711/170

(58) Field of Classification Search
USPC ......................................... 711/103, 154, 170
See application file for complete search history.

(56) References Cited

U.S. PATENT DOCUMENTS

| | | | |
|---|---|---|---|
| 5,937,425 A | 8/1999 | Ban | |
| 7,249,150 B1 | 7/2007 | Watanabe et al. | |
| 7,680,837 B2 | 3/2010 | Yamato | |
| 7,996,636 B1 | 8/2011 | Prakash et al. | |
| 8,082,390 B1 | 12/2011 | Fan et al. | |
| 8,099,396 B1 | 1/2012 | Novick et al. | |
| 8,205,065 B2 | 6/2012 | Matze | |
| 8,341,457 B2 | 12/2012 | Spry et al. | |
| 8,417,987 B1 | 4/2013 | Goel et al. | |
| 8,495,417 B2 | 7/2013 | Jernigan, IV et al. | |
| 8,839,008 B2 | 9/2013 | Faith et al. | |
| 8,560,879 B1 | 10/2013 | Goel | |
| 8,595,595 B1 | 11/2013 | Grcanac et al. | |
| 2003/0120869 A1 | 6/2003 | Lee et al. | |
| 2005/0144514 A1 | 6/2005 | Ulrich et al. | |
| 2007/0143359 A1 | 6/2007 | Uppala | |
| 2010/0042790 A1 | 2/2010 | Mondal et al. | |
| 2010/0088296 A1 | 4/2010 | Periyagaram et al. | |
| 2011/0035548 A1 | 2/2011 | Kimmel et al. | |
| 2011/0213928 A1 | 9/2011 | Grube et al. | |
| 2012/0290788 A1 | 11/2012 | Klemm et al. | |
| 2013/0018854 A1 | 1/2013 | Condict | |

(Continued)

OTHER PUBLICATIONS

Cornwall, Michael, "Anatomy of a Solid-state Drive," ACM Queue—Networks, vol. 10, No. 10, Oct. 2012, pp. 1-7.

(Continued)

*Primary Examiner* — Matthew Bradley
(74) *Attorney, Agent, or Firm* — Cesari and McKenna, LLP

(57) ABSTRACT

In one embodiment, an extent store layer of a storage input/output (I/O) stack executing on one or more nodes of a cluster manages efficient logging and checkpointing of metadata. The metadata managed by the extent store layer, i.e., the extent store metadata, resides in a memory (in-core) of each node and is illustratively organized as a key-value extent store embodied as one or more data structures, e.g., a set of hash tables. Changes to the set of hash tables are recorded as a continuous stream of changes to SSD embodied as an extent store layer log. A separate log stream structure (e.g., an in-core buffer) may be associated respectively with each hash table such that changed (i.e., dirtied) slots of the hash table are recorded as entries in the log stream structure. The hash tables are written to SSD using a fuzzy checkpointing technique.

20 Claims, 11 Drawing Sheets

(56) References Cited

U.S. PATENT DOCUMENTS

| | | |
|---|---|---|
| 2013/0138862 A1 | 5/2013 | Motwani et al. |
| 2013/0238832 A1 | 9/2013 | Dronamraju et al. |
| 2013/0238932 A1 | 9/2013 | Resch |
| 2013/0268497 A1 | 10/2013 | Baldwin et al. |
| 2013/0346810 A1 | 12/2013 | Kimmel et al. |

OTHER PUBLICATIONS

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Leventhal, Adam H. "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the $13^{th}$ ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

EXTENT METADATA UPDATE LOGGING AND CHECKPOINTING

RELATED APPLICATION

The present application is a continuation of U.S. patent application Ser. No. 14/158,689, entitled "Extent Metadata Update Logging and Checkpointing", filed on Jan. 17, 2014 by Jeffrey S. Kimmel et al., the contents of which are incorporated by reference herein in their entirety.

BACKGROUND

1. Technical Field

The present disclosure relates to storage systems and, more specifically, to efficient logging and checkpointing of metadata in a storage system.

2. Background Information

A storage system typically includes one or more storage devices, such as disks embodied as hard disk drives or solid state drives, into which information may be entered, and from which information may be obtained, as desired. The storage system may implement a high-level module, such as a file system, to logically organize the information stored on the disks as storage containers, such as files or logical units. Each storage container may be implemented as a set of data structures, such as data blocks that store data for the storage containers and metadata blocks that describe the data of the storage containers. For example, the metadata may describe, e.g., identify, storage locations on the disks for the data.

A traditional file system may perform fixed checkpoints, wherein the entire state of the file system is consistently written as an image on disk, as of a point in time. This may handicap an architecture that is configured to spread the metadata evenly through an entire main memory because updates, including any slightly changed blocks, spread throughout the memory may require most of the memory to be checkpointed. For example, assume the traditional file system renders continuous, small changes (updates) to the metadata that are collected and eventually written to disk as a series of 4 kilobyte pages. Generally, such updates occur evenly and randomly through the entire main memory of the system. Thus to checkpoint these updates may require writing the contents of the entire memory, which may consume many gigabytes and cannot be performed frequently. It is also desirable to avoid the bandwidth disruption resulting from writing out such a large amount of memory at once. That is, it is desirable to gather updates from the memory and store the updates efficiently on disk. A more efficient logging and checkpointing mechanism is thus needed.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Figure 1:
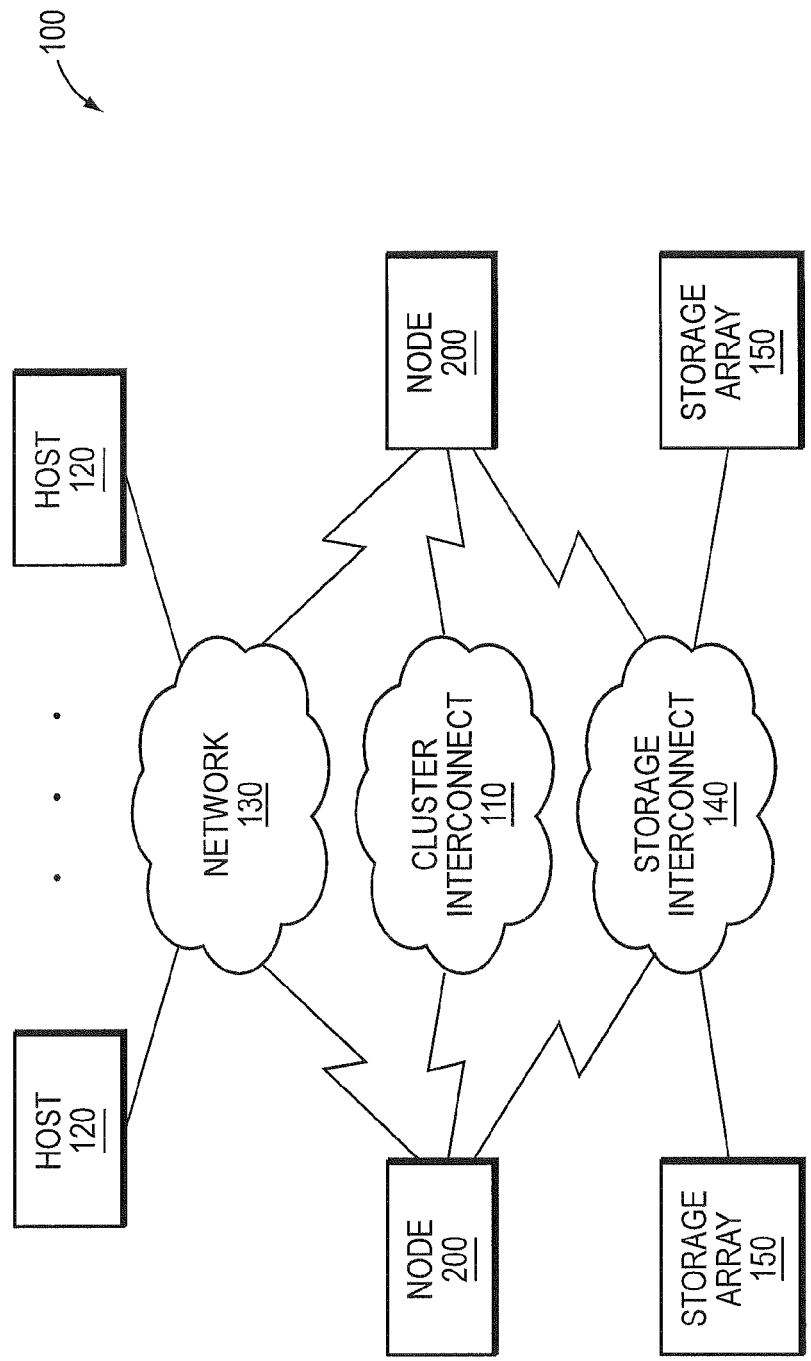
FIG. 1 is a block diagram of a plurality of nodes interconnected as a cluster.

The embodiments described herein are directed to efficient logging and checkpointing of metadata managed by an extent store layer of a storage input/output (I/O) stack executing on one or more nodes of a cluster. The extent store layer manages storage and retrieval of extents using keys. The metadata managed by the extent store layer, i.e., the extent store metadata, illustratively resides in a memory (in-core) of each node and is illustratively organized as a key-value extent store embodied as one or more data structures, e.g., a set of hash tables, wherein a value may be configured as an index (e.g., a hash table index) and applied to a hash table to obtain a corresponding key, such as an extent key, configured to reference a location of an extent on one or more storage devices, such as solid state drives (SSDs). Thus, the hash table embodies extent metadata that describes the extent and, as such, may be organized to associate a location on SSD with an index, i.e., a value associated with the hash table index identifying the location on SSD. Advantageously, logging and checkpointing of the extent metadata as described herein reduces write operations to storage, thereby reducing write amplification in the cluster.

In an embodiment, changes to the set of hash tables are illustratively recorded as (e.g., appended to) a continuous stream of changes embodied as an extent store layer log. Illustratively, a separate log stream structure (e.g., an in-core buffer) may be associated respectively with each hash table such that changed (i.e., dirtied) slots of the hash table are recorded as entries in the log stream structure. When the log stream structure grows large enough, the in-core log stream structure may be written to its corresponding log stream (i.e., to SSD) as a log stream page in one operation, and a new in-core page may be created in memory to receive further changes from the hash tables. Thus, previous versions of the log stream structure are stored in the corresponding log stream on SSD. The entries in the in-core log stream structure may thereafter be discarded once it is confirmed that the page, i.e., log stream page, is safely written to SSD.

In an embodiment, the hash tables are written to SSD using a fuzzy checkpointing technique wherein the contents of a given checkpoint (i.e., the hash tables) may not be directly useable (i.e., not point-in-time consistent) without applying recent log entries from the log streams (i.e., updates occurring during the checkpoint). This is because as the checkpoint is written to SSD, updates (i.e., changes) may occur to portions of the hash tables (i.e., hash table key-value) not yet written to SSD. Rather than representing a single point in a log stream chronologically (i.e., a point-in-time), the checkpoint represents a range of points in the log stream, so that the checkpoint may not be point-in-time consistent. Accordingly, reconciliation with updates recorded in the log stream may be required to recover a consistent version of the hash table. Further, only whole (i.e., completed) checkpoints may be used in reconciliation. That is, a checkpoint that is partially (or not) written is not used to recover a hash table. As a result, it may be necessary to apply multiple log streams during reconciliation.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to a storage array 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
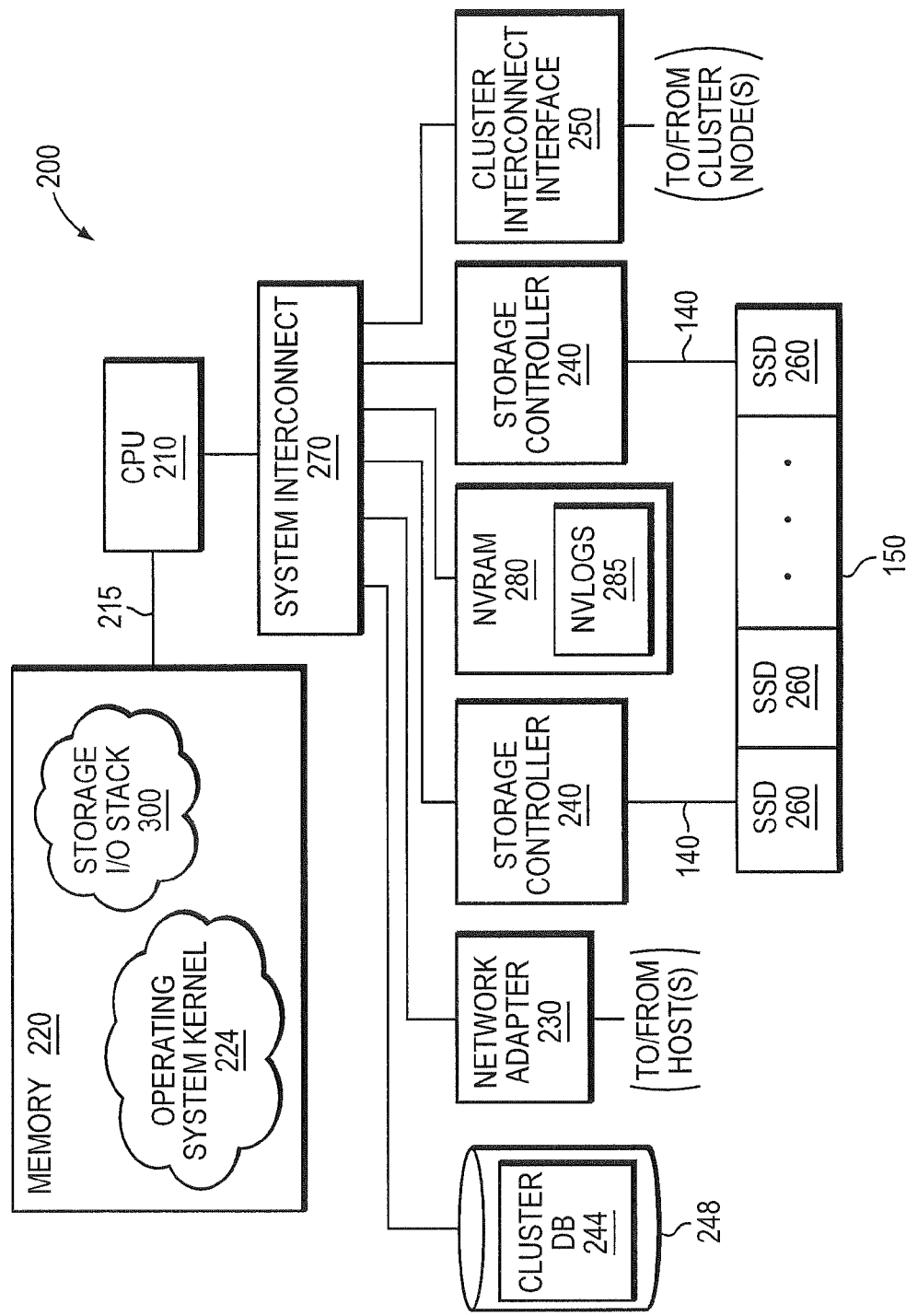
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively a serial attached SCSI (SAS) topology. Alternatively, other point-to-point I/O interconnect arrangements, such as a conventional serial ATA (SATA) topology and a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory, such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
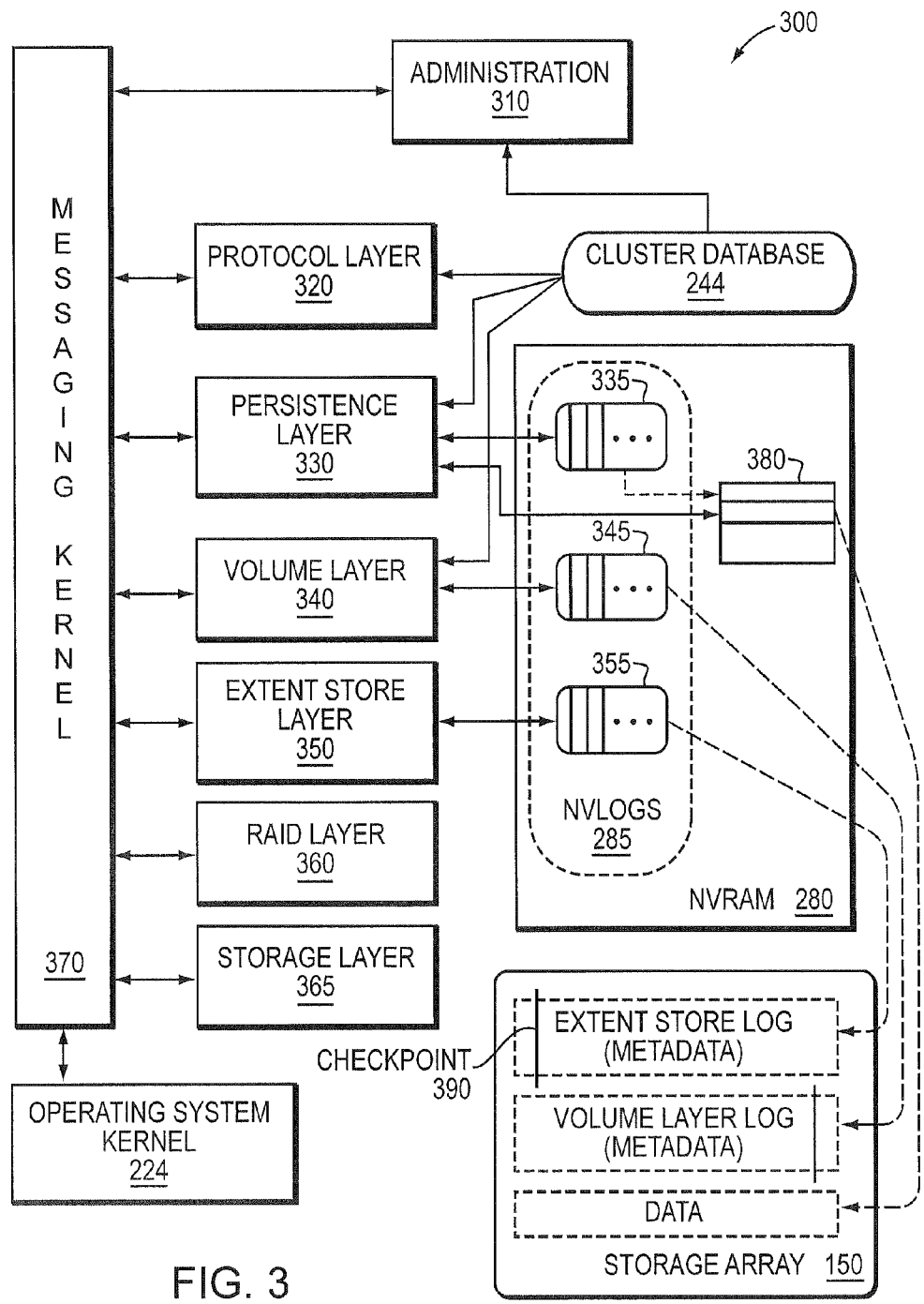
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment, only I/O requests that modify the LUN (e.g., write requests) are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement a write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. As described further herein, an extent is a variable length block of data that provides a unit of storage on the SSDs and need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of the log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings (less than the total) are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of continuous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with or without the operating system kernel 224, such as a Linux virtual function I/O (VFIO) driver.

Write Path

Figure 4:
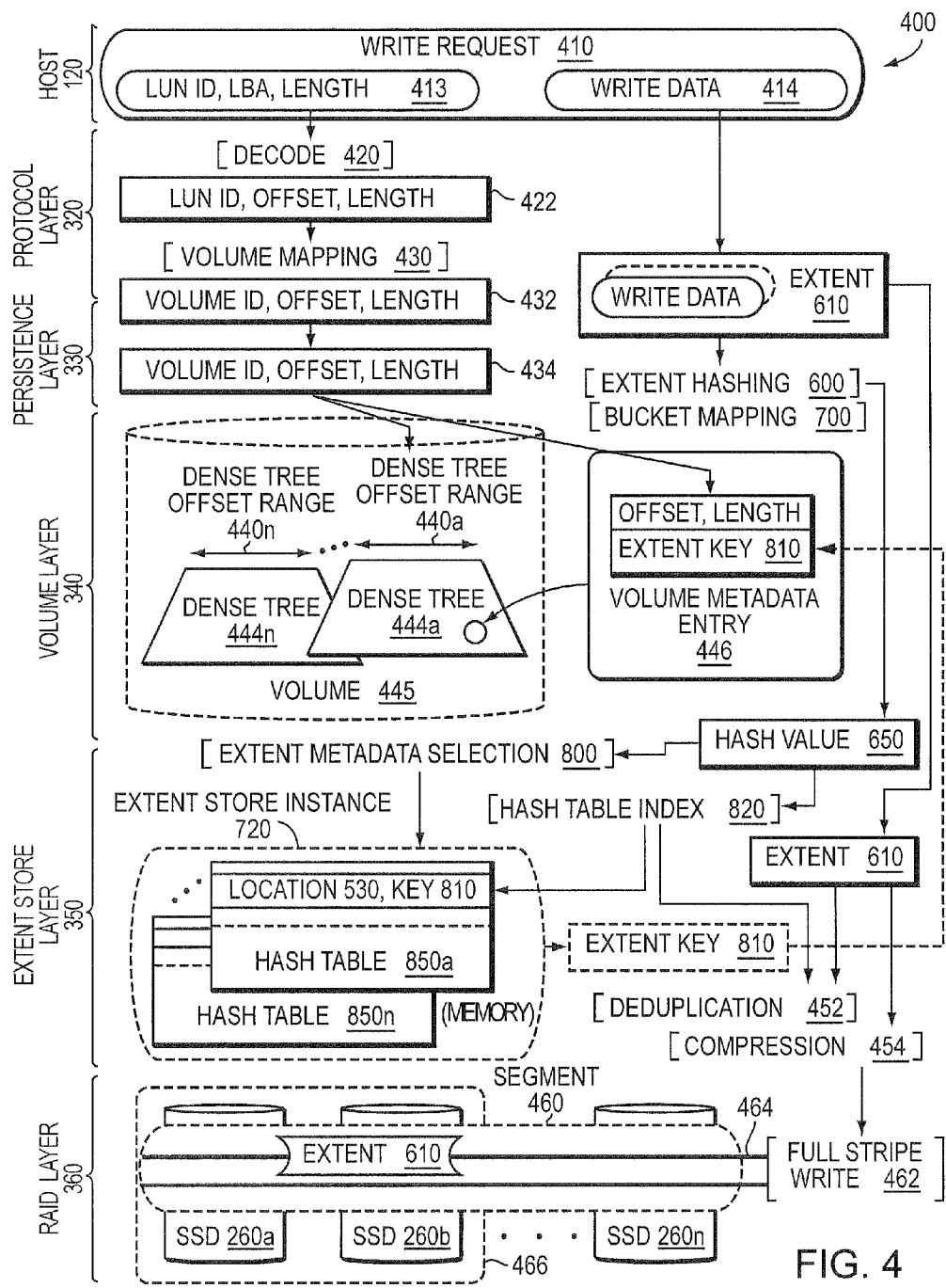
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. As described herein, the persistence layer 330 may aggregate and organize write data 414 from one or more write requests into a new extent 610 and perform a hash computation, i.e., a hash function, on the new extent to generate a hash value 650 in accordance with an extent hashing technique 600.

The persistence layer 330 may then pass the write with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 700 is provided that translates the hash value 650 to an instance 720 of an appropriate extent store layer (i.e., extent store instance 720) that is responsible for storing the new extent 610. Note, the bucket mapping technique may be implemented in any layer of the storage I/O stack above the extend store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 700 described herein. The persistence layer 330 may then pass the hash value 650 and the new extent 610 to the appropriate volume layer instance and onto the appropriate extent store instance via an extent store put operation. The extent hashing technique 600 may embody an approximately uniform hash function to ensure that any random extent to be written may have an approximately equal chance of falling into any extent store instance 720, i.e., hash buckets are distributed across extent store instances of the cluster 100 based on available resources. As a result, the bucket mapping technique 700 provides load-balancing of write operations (and, by symmetry, read operations) across nodes 200 of the cluster, while also leveling flash wear in the SSDs 260 of the cluster.

In response to the put operation, the extent store instance may process the hash value 650 to perform an extent metadata selection technique 800 that (i) selects an appropriate hash table 850 (e.g., hash table 850*a*) from a set of hash tables (illustratively in-core) within the extent store instance 720, and (ii) extracts a hash table index 820 from the hash value 650 to index into the selected hash table and lookup a table entry having an extent key 810 identifying a storage location 530 on SSD 260 for the extent. Accordingly, the extent store layer 350 may contain computer executable instructions executed by the CPU 210 to perform operations that implement the extent metadata selection technique 800. If a table entry with a matching key is found, then the SSD location 530 mapped from the extent key 810 is used to retrieve an existing extent (not shown) from SSD. The existing extent is then compared with the new extent 610 to determine whether their data is identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 810 of the existing extent is passed to the appropriate volume layer instance for storage within an entry (denoted as volume metadata entry 446) of a dense tree metadata structure 444 (e.g., dense tree 444a), such that the extent key 810 is associated an offset range 440 (e.g., offset range 440a) of the volume 445.

However, if the data of the existing extent is not identical to the data of the new extent 610, a collision occurs and a deterministic algorithm is invoked to sequentially generate as many new candidate extent keys (not shown) mapping to the same bucket as needed to either provide de-duplication 452 or to produce an extent key that is not already within the extent store instance. Notably, another hash table (e.g. hash table 850n) may be selected by a new candidate extent key in accordance with the extent metadata selection technique 800. In the event that no de-duplication opportunity exists (i.e., the extent is not already stored) the new extent 610 is compressed in accordance with compression technique 454 and passed to the RAID layer 360, which processes the new extent 610 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 610. Illustratively, the identified storage segment is a segment with a large contiguous free space having, e.g., location 530 on SSD 260b for storing the extent 610.

In an embodiment, the RAID layer 360 then writes the stripes 464 across the RAID group 466, illustratively as one or more full write stripes 462. The RAID layer 360 may write a series of stripes 464 of sufficient depth to reduce data relocation that may occur within flash-based SSDs 260 (i.e., flash block management). The extent store instance then (i) loads the SSD location 530 of the new extent 610 into the selected hash table 850n (i.e., as selected by the new candidate extent key), (ii) passes a new extent key (denoted as extent key 810) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer log 345. Accordingly, the I/O (write) request is sufficiently stored on SSD 260 of the cluster.

Read Path

Figure 5:
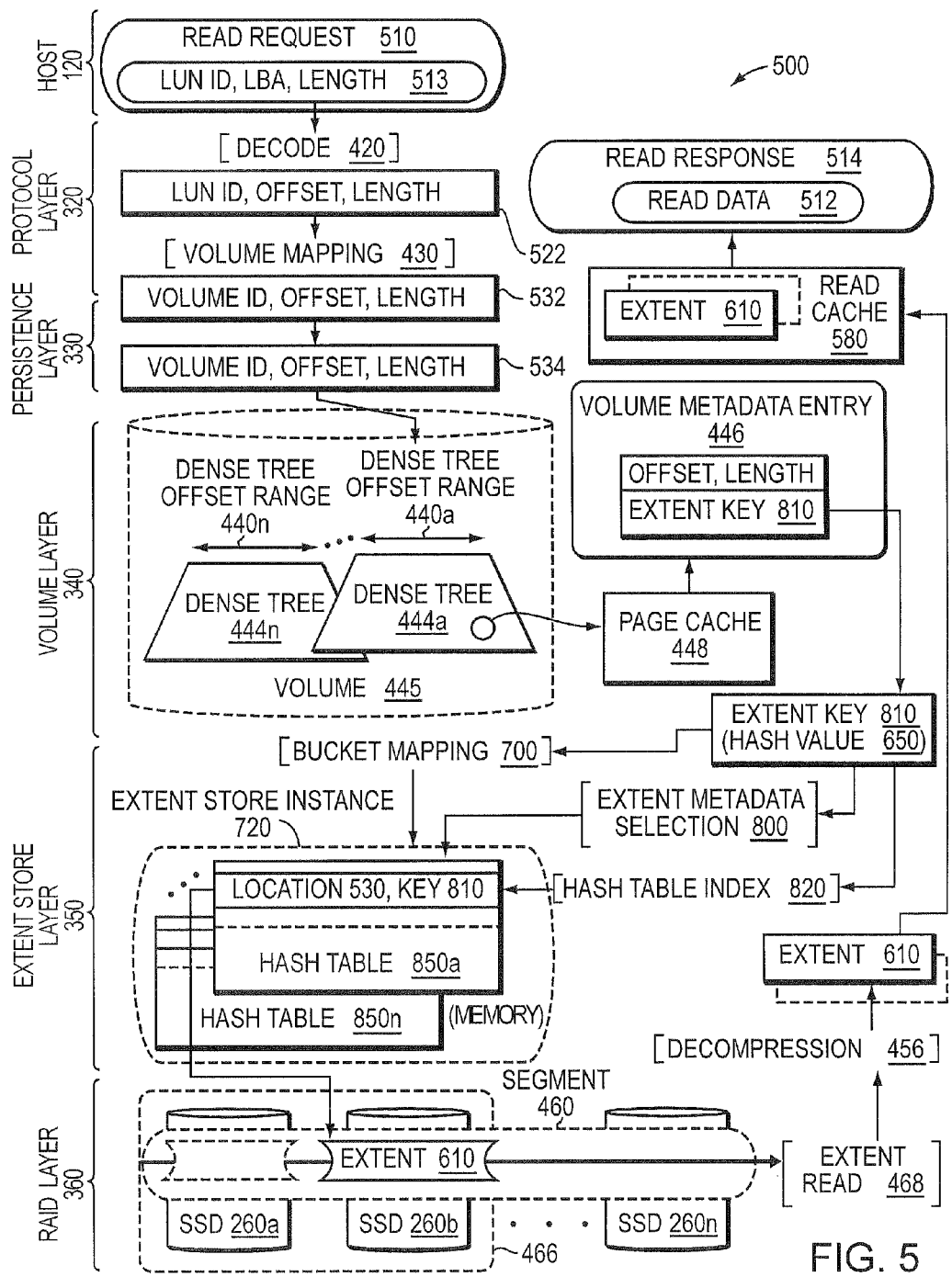
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) that translates the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write-back cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 810 associated with one or more extents 610 within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 810 for the entire requested read range are found. If no metadata entries exist for the entire or portions of the requested read range, then the missing portion(s) are zero filled.

Once found, each extent key 810 is processed by the volume layer 340 to, e.g., implement the bucket mapping technique 700 that translates the extent key to an appropriate extent store instance 720 responsible for storing the requested extent 610. Note that, in an embodiment, each extent key 810 may be substantially identical to the hash value 650 associated with the extent 610, i.e., the hash value as calculated during the write request for the extent, such that the bucket mapping 700 and extent metadata selection 800 techniques may be used for both write and read path operations. Note also that the extent key 810 may be derived from the hash value 650. The volume layer 340 may then pass the extent key 810 (i.e., the hash value from a previous write request for the extent) to the appropriate extent store instance 720 (via an extent store get operation), which performs an extent key-to-SSD mapping to determine the location on SSD 260 for the extent.

In response to the get operation, the extent store instance may process the extent key 810 (i.e., hash value 650) to perform the extent metadata selection technique 800 that (i) selects an appropriate hash table 850 (e.g., hash table 850a) from a set of hash tables within the extent store instance 720, and (ii) extracts a hash table index 820 from the extent key 810 (i.e., hash value 650) to index into the selected hash table and lookup a table entry having a matching extent key 810 that identifies a storage location 530 on SSD 260 for the extent 610. That is, the SSD location 530 mapped to the extent key 810 may be used to retrieve the existing extent (denoted as extent 610) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although those of skill in the art will understand that decompression can be performed at any layer of the storage I/O stack 300. The extent 610 may be stored in a buffer (not shown) in memory 220 and a reference to that buffer may be passed back through the layers of the storage I/O stack. The persistent layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Extent Hash Structure

Figure 6:
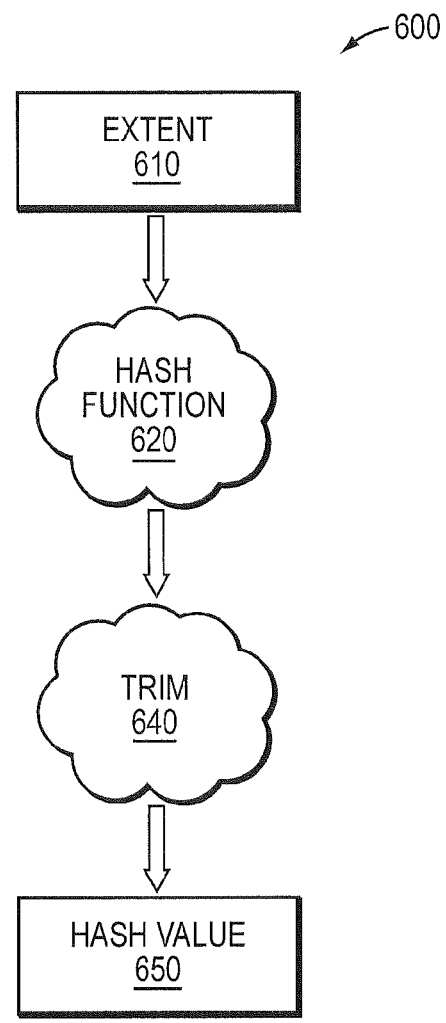
FIG. 6 is a block diagram of an extent hashing technique.

FIG. 6 is a block diagram of the extent hashing technique 600 that may be advantageously used with one or more embodiments described herein. As noted, the persistence layer 330 may organize the write data of one or more write requests into one or more extents 610, each of which is embodied as a variable length block. The length of the extent may vary between 1 byte and 64 KB (or larger) although, e.g., the extent is typically 4 KB or more in length. The extent 610 is illustratively a logically contiguous portion of a LUN (or file) that is stored physically contiguous on SSD 260 within a node of the cluster so that, e.g., it can be read from the SSD in a single read operation. Thus, extents aggregated from multiple I/O requests may form contiguous offset ranges within any LUN. Accordingly, multiple LUNs (and/or files) may share the same extent at different addresses (so long as logically contiguous within each LUN), because the extent generally does not maintain information with respect to its presence in the storage pool of the cluster 100.

In an embodiment, a random technique, such as a hash function 620 (e.g., an approximately uniform hash), may be applied to each extent 610 to generate a hash value 650 that is used to distribute (e.g., using the extent metadata selection technique) the write data (i.e., extent data) and associated metadata substantially evenly among the nodes 200 to enable fine-grain scale out and de-duplication 452 in the cluster 100. The hash computation is performed on the entire extent and may be computed any time before the extent is passed to an extent store instance. Illustratively, the resulting hash value 650 may be used for two generally similar tasks. The first task is to distribute (spread) the extents and associated metadata evenly within each extent store instances. Thus, the hash value 650 is illustratively computed at the persistence layer 330, but may be computed at or before the volume layer 340 because the volume layer needs the hash value to determine the extent store instance of a node that services the extent.

The hash computation is illustratively performed in accordance with a secure hash algorithm, e.g., SHA-3 or ECHO 256 cryptographic hash function, to generate a 256-bit hash function result (not shown). Alternatively, hash algorithms, such as SipHash (secure 64-bit) or CityHash (non-crypto 64-bit) may be used. A portion, e.g., the lower 6 bytes (i.e., 48-bits), of the 256-bit hash function result may be illustratively trimmed, e.g., in accordance with a trim technique 640, to generate a 48-bit hash value 650. It will be apparent to those skilled in the art that the trimmed size of the hash value may be enlarged as the storage capacity of the cluster increases. In an embodiment, the trim technique 640 essentially truncates or severs the 6-byte (48-bit) portion of the hash value 650 from the 32-byte hash function result. The resulting 6 bytes (48 bits) of the hash value 650 are illustratively sufficient to enable the extent store instance to find a representation of the location of the extent 610 on SSD 260 via entries in the hash tables 850. In addition, the hash value 650 illustratively enables its associated metadata, e.g., extent metadata in entries of the hash tables 850, to reside entirely in memory 220. The hash value 650 may be used to perform address-like determinations within portions of its hash space in accordance with various techniques, such as bucket mapping 700 and extent metadata selection 800 within the storage I/O stack 300, to select the appropriate hash table 850a for the extent 610.

Figure 7:
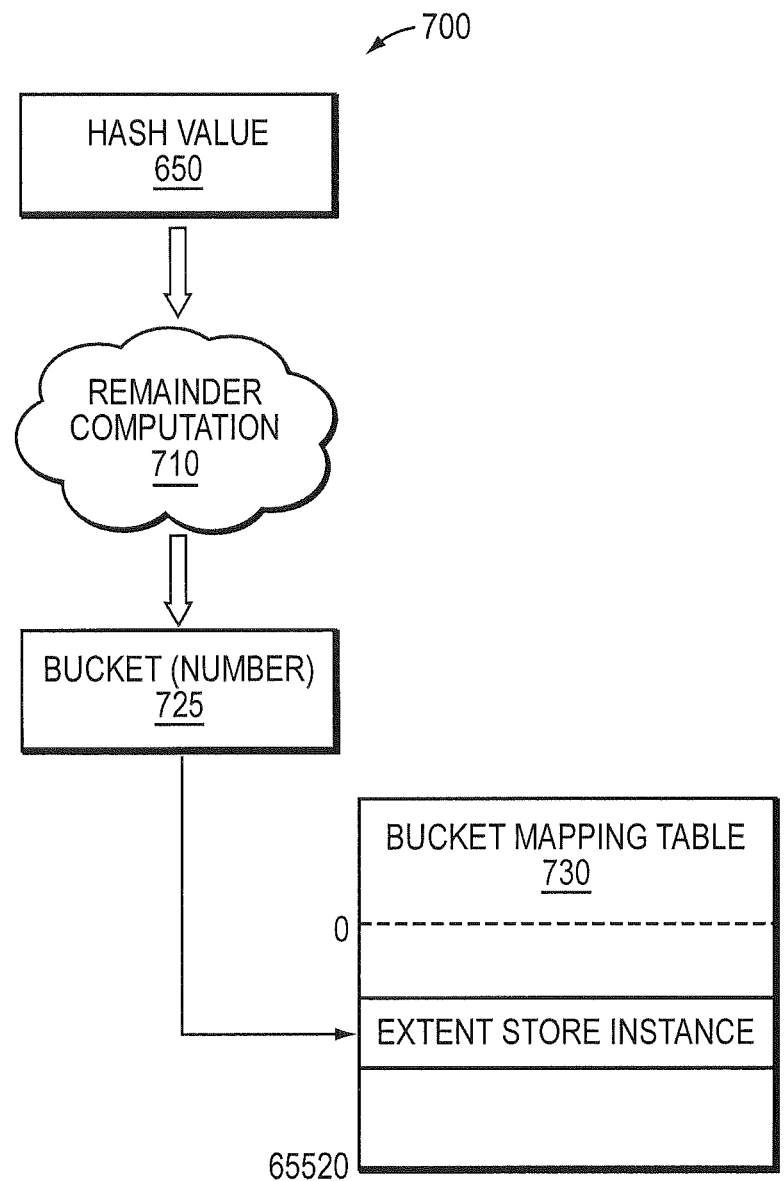
FIG. 7 is a block diagram of a bucket mapping technique.

FIG. 7 is a block diagram of the bucket mapping technique 700 that may be advantageously used with one or more embodiments described herein. As noted, the hash value 650 may be computed at the persistence layer 330 so as to enable efficient distribution of the extents 610 and associated extent metadata evenly throughout the nodes 200 of the cluster. In an embodiment, the mapping technique divides (e.g., substantially evenly) the hash space of the 48-bit hash value 650 (i.e., $2^{48}$) into buckets that, collectively, are representative of the extents and associated extent metadata. A substantially equal number of buckets is then assigned or mapped to each extent store instance of the nodes in the cluster 100 to thereby distribute ownership of the buckets, and thus the extents and extent metadata, substantially evenly, i.e., approximately uniformly, across all the extent store instances 720 of the nodes 200. Notably, the buckets may be alternatively assigned (or reassigned) by weighted distribution according to characteristics of the nodes such as storage capacity and performance.

In an embodiment, the bucket mapping technique maps buckets to extent store instances using a remainder computation 710 based on modulus arithmetic: the hash value divided by (modulo) the number of buckets, e.g., [hash value] mod [number of buckets]. Illustratively, the number of buckets (i.e., divisors) is a prime, e.g., 65521 (the largest prime less than $2^{16}$), although those skilled in the art will recognize that other divisors may be used in accordance with the embodiments described herein. The results of the remainder computation may be organized as a data structure, such as a bucket mapping table 730, having 65521 bucket number entries, each of which maps to (references) an extent store instance. Alternatively, a bucket mapping data structure in the cluster database 244 may be used to associate a bucket (number) 725, e.g. 0-65520, to an extent store instance or node 200 to thereby map the corresponding bucket to that extent store instance or node.

The buckets may be continually mapped to extent store instances and, as new extents 610 are formed, they may be assigned to the buckets. The mappings from bucket numbers to extent store instances of the nodes are essentially arbitrary; a requirement may be that the number of buckets served by each extent store instance is proportional to the storage capacity and processing bandwidth available in each node 200. The buckets 725 may be distributed among the extent store instances to thereby achieve a substantially even and balanced level of capacity and bandwidth utilization across all of the nodes in the cluster 100.

A new extent 610 may be subsequently formed at a node and applied to the hash function 620 to generate a result (as described above), which may be trimmed using technique 640 to generate the hash value 650 to select the extent store instance for storing the new extent 610. The hash value 650 may then be processed by the remainder computation 710 that divides the hash value by the number of buckets, e.g., [hash value] mod [number of buckets], wherein the number of buckets is illustratively a prime, e.g., 65521. The result of the computation generates a bucket number associated with a bucket that functions as an index into a selected entry of the bucket mapping table 730 to identify an extent store instance that serves the new extent associated with the hash value 650. Alternatively, the bucket mapping data structure of the cluster database 244 may be searched using the bucket number as a key to identify an associated value, i.e., an extent store instance or node 200, of a key-value pair. The hash value 650 may thereafter be passed to the extent store instance to enable selection of extent metadata used to identify a location 530 of the extent on SSD 260.

Cuckoo Hashing

The embodiments described herein are directed to the use of hashing in a file system metadata arrangement that reduces an amount of metadata stored in a memory of a node in a cluster and that reduces the amount of metadata needed to process an I/O request at the node. Illustratively, the embodiments are directed to cuckoo hashing and, in particular, to a manner in which cuckoo hashing may be modified and applied to construct the file system metadata arrangement. In an embodiment, the file system metadata arrangement may be illustratively configured as a key-value extent store embodied as a data structure, e.g., a cuckoo hash table, wherein a value, such as a hash table index, may be applied to the cuckoo hash table to obtain a key, such as an extent key, configured to reference a location of an extent on one or more storage devices, such as SSDs. Thus, the cuckoo hash table embodies extent metadata that describes the extent and, as such, may be organized to associate a location on SSD with an index, i.e., a value associated with the hash table index identifies the location on SSD. Advantageously, the file system metadata arrangement achieves a high degree of metadata compactness, thus reducing read and write amplification as well as memory requirements.

In an embodiment, storage and retrieval of key-value pairs employ cuckoo hashing, i.e., the set of cuckoo hash tables, using a portion of the hash value 650 as a hash table index (i.e., indexing into the cuckoo hash table), which key is illustratively split in half. Each half of the hash table index may be used as an index into each cuckoo hash table to determine a potential entry for storing the other half of the hash table index in the table. That is, one half of the hash table index may be used as the index into the cuckoo hash table, while the other half may be used as the value stored in the hash table. Alternatively, the other half of the hash table index may be used as the index, while the one half may be used as the stored value. Thus, the same hash table index can be stored in the cuckoo hash table in two different ways, i.e., either in an upper half or lower half of the cuckoo hash table. This allows higher population, i.e., load factor, in the hash table without chaining, e.g., the use of linked lists, by accessing an entry with the one half of the hash table index as the index and, if the entry is occupied, accessing another entry with the other half of the hash table index as the index. Accordingly, cuckoo hashing reduces an amount of metadata (i.e., the hash table index) stored in the memory of the node as a result of a higher load factor. If both entries are occupied, then one of the two entries is chosen and the prior content of the entry may be evicted and re-inserted into the cuckoo table at an alternate location (i.e., alternate entry) using the prior content as an alternate index to the hash table, i.e., not resolving to either of the two entries. The hash table index, i.e., referencing the chosen entry, may then be stored at the alternate location. If the alternate location also is occupied, the prior content of the alternate entry may also be evicted. This eviction process may be repeated until an unoccupied entry is found.

However, as full capacity (i.e., load) of the hash table is approached, a cycle effect may be realized wherein two or more entries chain together through their present and alternate hash table locations to form a complete cycle; if this occurs, no new insertions can occur at any of these locations. To eliminate this problem, the cuckoo hash table embodies a set associative organization such that, for each entry that is indexed by half of the hash table index, there is a plurality of possible slots (i.e., a group of slots associated with the index) into which the other half of the hash table index may be inserted/stored, i.e., all of the slots are associated with the indexing hash table index (i.e., the hash table index used to index the group of slots), but each slot may include a different other half of the hash table index. Generally, a free slot of the plurality of possible slots may be found by linear search of the plurality of slots for the non-indexing half of the hash table index, i.e., if K1 indexes for the entry/slot, a search for K2 is performed. Alternatively, the associative set may be sorted permitting a more efficient search, e.g., a binary search, to be used.

In an embodiment, the cuckoo hash table may be organized with a 32-way set associativity, i.e., the hash table index stored in the cuckoo hash table may be found in any of 32 slots of the hash table indexed at the one half of the hash table index or any of 32 slots indexed by the other half of the hash table index. If an adequately uniform hash function is used, the distribution may be sufficiently balanced such that there may be un-occupied slots for a given hash value. That is, as long as the entire hash table is not full, one of the 64 potential slots for the hash table index is likely to be unoccupied so that the hash table index can be inserted into that slot. If all 64 slots are occupied, it is likely that one of the 64 occupants can be moved to an empty entry/slot without any further relocation. Note that every time contents are moved from one entry/slot to another in the hash tables, the corresponding hash table index 820 may be logged to record changes to the hash table. Advantageously, the 32-way set associativity may provide a load factor greater than 98%, so that values inserted into the hash table remain in the slots/entries and are not pushed out by the cuckoo hashing until the table is substantially full. By using the cuckoo hash, two possible entries for an extent key in the hash table can be directly computed and the 64 slots associated with the entries can be inspected, i.e., searched, to find the extent key. Illustratively, entries of the cuckoo hash table may be sized so that all 32 slots for the hash table index fit in a cache line of the CPU 210 enabling a fast linear search of the slots.

Hash Table Organization

Figure 8A:
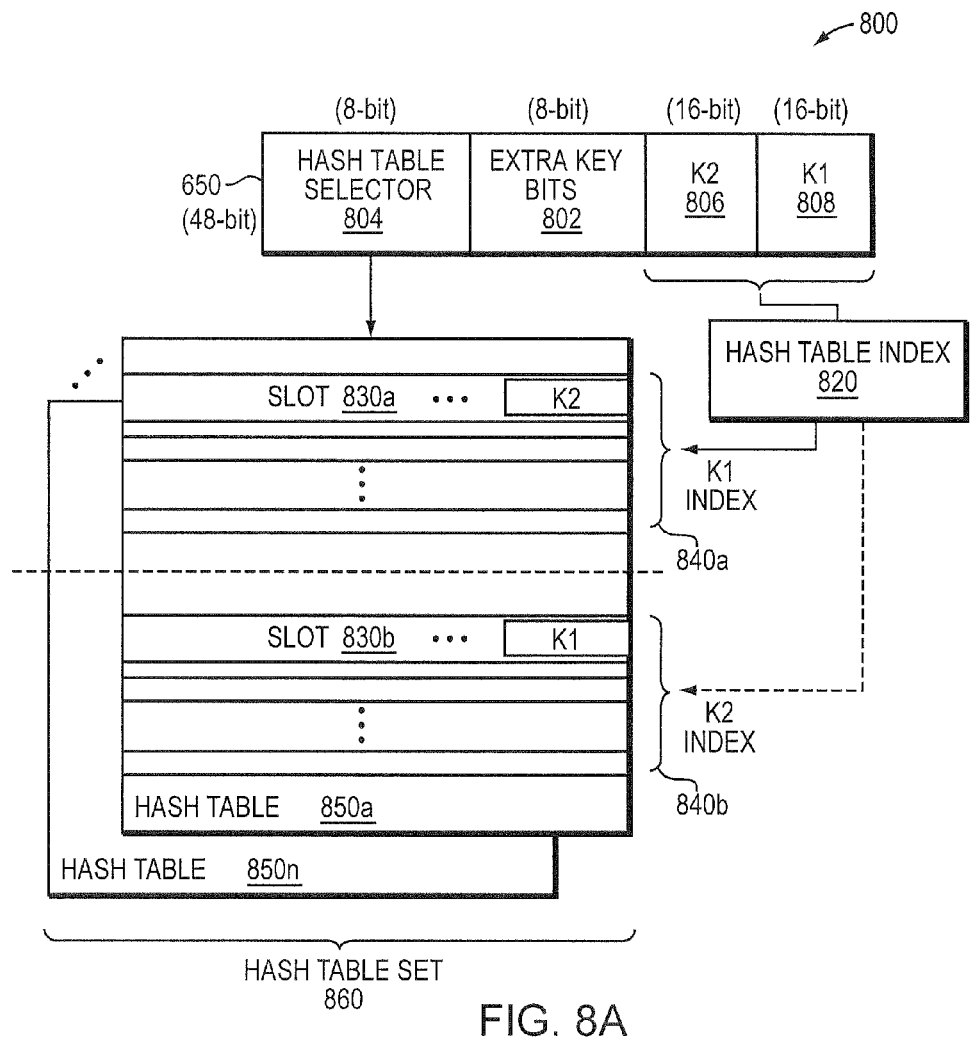
FIG. 8a is a block diagram of a hash table entry selection technique.

FIG. 8a is a block diagram of a cuckoo hash table that may be advantageously used with one or more embodiments described herein. In an embodiment, the extent metadata resides entirely in the memory 220 of each node 200 and is embodied as a hash table 850a-n of a set of hash tables 860 configured to address locations of the SSD. Note that the bucket mapping technique 700 ensures that the buckets assigned to the extent store instances are substantially evenly populated with extent metadata such that each bucket contributes equally to the hash tables served by an extent store instance, i.e., the bucket mapping technique 700 has an approximately uniform distribution. The extent store instance may use the hash value 650 to provide the extent metadata selection technique 800. To that end, the contents of the 48-bit (6 byte) hash value, i.e., the hash value 650, are illustratively organized into the following fields: an 8-bit field used as an index to select a hash table, i.e., one of 256 tables, from the set of hash tables ("hash table selector" 804), an 8-bit field ("extra key bits" 802), and two 16-bit fields used as indices to entries 840a-b (i.e., group of slots) in the selected hash table ("K2" 806 and "K1" 808). Each hash table 850 includes two halves where each half is addressable by one of the 16-bit indices (e.g., "K1" and "K2"), so that each table half may include 65536 (i.e., $2^{16}$) entries 840. Note, the hash table index 820 is determined from K1 and K2 depending on which half of the hash table is indexed. Further, each entry 840a-b is a 32-way associative set of slots 830 having the key-value pair. Accordingly, there are $2^{16} \times 32 \times 2$ (i.e., entries×associatively×2 table halves)=4 M (4,194,240) total entries/slots ("slots") per hash table and at least 256 tables, i.e., hash table selector 804, per extent store instance, yielding a billion (1,073,725,440 exactly) slots. Notably, the hash table set may be further expanded into subsets selected based on a function applied to the hash value 650 (e.g., computing a remainder of the hash value 650 for a prime number as an index to a subset of the hash table set 860), an exemplary embodiment of which is described in commonly owned U.S. patent application Ser. No. 14/044,624 titled Extent Hash Structure for Storage System by Kimmel et al., filed on Oct. 2, 2013.

Figure 8B:
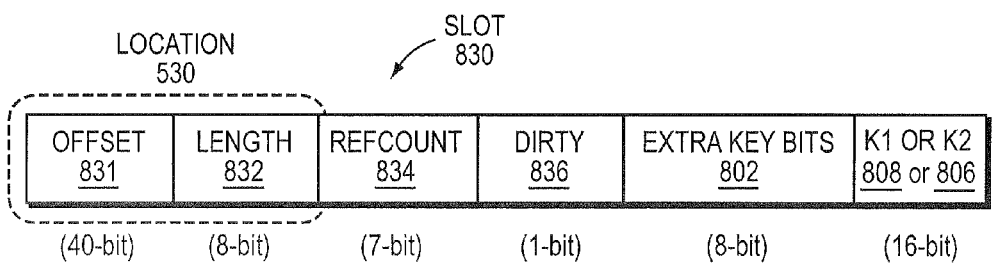
FIG. 8b is a block diagram of a hash table slot.

FIG. 8b is a block diagram of a hash table slot 830 that may be advantageously used with one or more embodiments described herein. Illustratively, the slot is organized as a 10-byte (80-bit) value having the following fields: a 5-byte (i.e., 40-bit) offset 831 indicating a location on SSD for an extent "keyed" by the slot; a 1-byte (8-bit) length 832 indicating a size of the extent; a reference count having at least 7-bits ("refcount" 834) indicating a number of metadata references to the extent; a dirty bit 836 indicating whether the slot has been changed, i.e., is "dirty"; the extra key bits 802 from the hash value 650 for the extent; and either "K1" 808 or "K2" 806 not used as the hash table index 820 to index to the entry 840. Note that the length field 832 may represent a number of sectors of a given size based on the geometry of the SSD 260, e.g., 512 bytes or 520 bytes, such that a 1-byte length may represent a range of 255×512 bytes=128K bytes. Accordingly, an extent may vary from 512 bytes to 128K bytes in 512 byte increments.

In an embodiment, combinations of sentinel values in one or more fields of the slot 830 may be used to indicate a type of extent, such as i) a "hole" or deleted extent and ii) a "put" or stored extent. For example, a refcount 834 of zero and offset 831 of zero may be used to indicate a deleted extent, whereas a refcount 834 greater than zero (i.e., one) and offset 831 other than zero may be used to indicate a stored extent. Compactness of the slot fields benefits efficient use of memory as it is desirable to maintain the hash tables in-core for fast lookup of key-value pairs, i.e., locations of extents from hash keys. For example, the previously calculated 1 billion slots may consume 10 GB in-core, i.e., 10-bytes per slot, not including any expansion (e.g., the expansion technique in an exemplary embodiment in aforementioned U.S. patent application Extent Hash Structure for Storage System multiplies the in-core consumption by 3). Notably, each extent store instance may support a LUN capacity of at least 4 terabytes (TB) based on a minimum 4 KB extent size (1 B×4 KB per extent) to a maximum of 384 TB based on a 128 KB extent size with hash table expansion (1 B×3 expansion×128 KB per extent).

Once a hash table 850a is selected, the extent store instance may extract either K1 or K2 of the hash value 650 for use as the hash table index 820 to index into the hash table (e.g., using K1 for the upper half of the table and K2 for the lower half of the table) and select an appropriate entry 840a configured to store, inter alia, a portion of the extent key 810, as well as an identification of location on SSD. Notably, K1 and K2 are distinguished from each other using an implied high-order bit that splits the cuckoo hash table into an upper address space and a lower address space. Illustratively, the implied high-order bit increases the address capability of K1 or K2 from $2^{16}$ possible locations to $2^{17}$ possible locations, where the upper address space of the hash table is addressable by one 16-bit field (e.g., K1) of the hash value and a lower address space of the hash table is addressable by the other 16-bit field (e.g., K2). In an embodiment, the selection of which hash table index (K1 or K2) to use to initially index into cuckoo hash table is arbitrary. In the case of an insertion of an entry (e.g., storing an extent) into the cuckoo hash table 850a, a desired approach may be to choose whichever upper or lower address space set is less occupied (after an exhaustive search of both sets 840a and 840b).

As noted, each cuckoo hash table has set-associative slots, e.g., 32 slots per associative set. In an embodiment, there is no ordering of the 32 slots within the associative set of an entry; a linear search may be performed to find an empty slot for inserting an extent key. Alternatively, the slots may be ordered to accommodate a faster search, e.g., binary search, especially for larger associative sets (e.g., 128 way), which may not fit into a CPU cache line. Similarly, once the associative set of slots is identified, i.e., as entry 840, that could hold the extent key, the linear search may be performed within the slots to determine whether the key is present. The advantage of the cuckoo hash table is that there are exactly 2 entries (each having 32 slots) in the entire cluster 100 at which a given extent key value can reside. Once the entry is indexed using K1 or K2 along with the implied high-order bit, there are 32 slots within the entry 840 to search.

In an embodiment, the number of slots per entry 840 is illustratively chosen as 32, because all 32 slots can fit into a cache line of, for example, an Intel processor (i.e., 32× size of the hash table index 820 in the slot). In other words, 16 bits or 2 bytes (K1 or K2) times the 32 slots equals 64 bytes, which is the size of an illustrative cache line. Once an operation fetches and manipulates a cache line, the cache line remains cached until it is evicted. For a linear search of the cached slots 830, no further fetch from memory may be required, thus avoiding any eviction of previously cached slots for the entry 840. Illustratively, the size of the set (i.e., 32 slots) is arbitrary and chosen so as to fit in the cache line. Without changing any of the algorithms for accessing a given set, i.e., entry 840, the set size could be changed to an arbitrary integer and even vary per set. The information constituting the remaining 8 bytes of an entry (including the offset 831 which constitutes part of the extent location 530 on SSD) may be stored out-of-line, i.e., not cached during the search of slots, in another portion of the hash table 850. It should be noted that the hash table 850 may be stored in column major order in memory (e.g., defining the hash table in the "C" programming language as a structure including the fields of the slot 830 as separate arrays). Thus, if it is desirable to access the K1 or K2 16-bit field, only one cache line access may be required.

Extent Metadata Logging

Figure 9A:
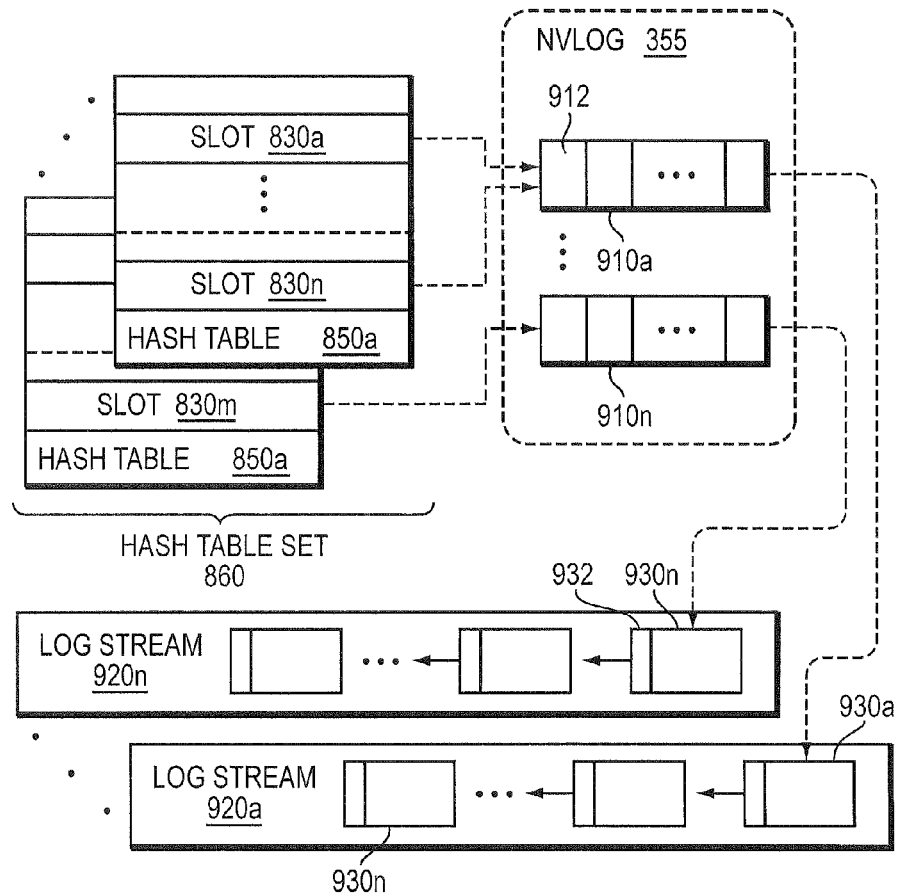
FIG. 9a is a block diagram of a hash table log stream.

FIG. 9a is a block diagram of a hash table log stream that may be advantageously used with one or more embodiments described herein. In an embodiment, changes to the set of hash tables 860 are illustratively recorded as (e.g., appended to) a continuous stream of changes embodied as the extent store layer log 355 of the NVlogs 285. Illustratively, a separate log stream structure 910 of the log 355 may be associated respectively with each hash table 850 such that changed (i.e., dirtied) slots 830 of the hash table 850 are recorded as entries 912 in the log stream structure 910. That is, updates, i.e., changes, from the hash tables are stored in their corresponding log stream structures 910 prior to storage on SSD. A copy (not shown) of the log stream structure 910 may be stored in memory 220 (e.g., as an in-core buffer); in addition, previous contents of the log stream structure 910 may be stored in a corresponding log stream 920 on SSD. When the log stream structure 910 grows large enough (e.g., to 8 KB) the in-core copy of the log stream structure 910 may be written to its corresponding log stream 920 (i.e., to SSD) as a log stream page 930 (e.g., an 8 KB page update) in one operation, and a new in-core page may be created in memory 220 to receive further changes from the hash tables. Notably, the log stream structure 910 may be implemented as a double buffer to accommodate writing to SSD (i.e., log stream 920) while also recording entries 912 to the log stream structure. The entries 912 in the log stream structure 910 may thereafter be discarded once it is confirmed that the corresponding page, i.e., log stream page 930, is safely written to SSD. Notably, the log stream 920a-n, i.e., log stream pages 930a-n, may be stored as extents of the extent store instance being logged without relying on that extent store instance's metadata, i.e., without using slots in the hash tables of that extent store instance to locate the log stream pages. Instead, a separate location mechanism may be used to locate the log stream pages. Illustratively, each log stream page 930 may include a pointer 932 indicating the location of a previous log stream page on SSD, i.e., reverse chronological order. Alternatively, the log stream pages may be located via an indexing structure (e.g., organizing the log in reverse chronological order) stored in the log stream 920, e.g., at a known offset, such as at a log stream beginning.

In an embodiment, there may be 256 log streams, which number is illustratively determined based on the time needed for a node 200 to reboot. That is, given a reboot time threshold, e.g., one second, the number of log streams is determined so that the node may begin servicing requests from the volume layer within the reboot time threshold (i.e., a reboot time to service). During reboot, if there are too few log streams (e.g., too many log stream pages associated with each log stream), the aggregate log read rate may be inadequate, because it is desirable that the node be able to serially access each of the log streams. As a result, the node may not be able to meet the reboot time to service. Accordingly, an adequate number of log streams 920 may be needed, e.g., spread across the SSDs, so that an aggregate read bandwidth of the SSDs is sufficient to meet the reboot time to service. It should be noted that the metadata, i.e., the hash table slots 830a-n, are approximately evenly distributed via the extent hashing technique 600, so that no log stream exceeds twice the average log stream size, which provides for evenly distributed read requests among the log streams during reboot to facilitate a low reboot time to service. Further, adequate available cluster resources may also permit multiple hash tables 850 to be associated with each log stream 920 as described by the expansion technique in aforementioned U.S. patent application Extent Hash Structure for Storage System (e.g., increasing the number of hash tables associated with each log stream by three, so that tables 0-2 may map to the first log stream, tables 3-5 may map to the second log stream, etc).

Figure 9B:
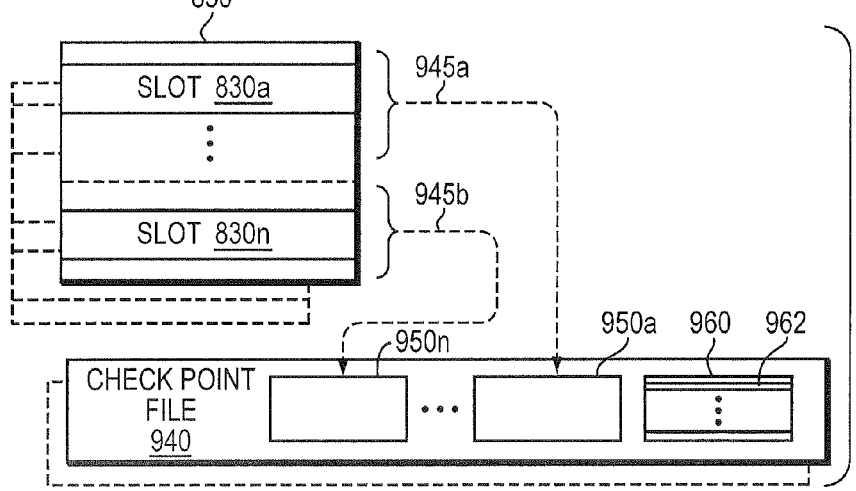
FIG. 9b is a block diagram of a hash table checkpoint file.

Organizing the log streams and hash tables in this fashion may provide locality of reference, so that all of the log entries 912 in the log stream structures 910a-n for each hash table may be directed to a respective single log stream 920. Thus, a checkpoint of the metadata in each hash table, i.e., the slots 830a-n, may be stored in a respective checkpoint file associated with that log stream. FIG. 9b is a block diagram of a hash table checkpoint file 940 that may be advantageously used with one or more embodiments described herein. Slots 830 of the hash table 850 may be formed into groups 945 and written as checkpoint having one or more checkpoint pages 950 within the checkpoint file 940. The checkpoint pages 950 and log stream pages 930 may include the same number of hash table slots and, thus, be of a same size, e.g., 8 KB. In this manner both logging and checkpointing of each hash table are independent of one another. Accordingly, the hash tables (and updates) may be segregated so that when a hash table (or group of hash tables) is associated with a particular CPU or thread of execution (i.e., each hash table has a processor affinity) no complicated locking is necessary to ensure the safety of multi-processing algorithms. For example, CPU 1 may be assigned hash tables 1-10, CPU 2 may be assigned tables 11-20, etc. Thus, an I/O request that is directed to hash table 1 may be processed by CPU 1 every time, so that there is no need for multiprocessor locking in order to achieve high throughput in a multiprocessing environment.

As with the log stream pages 930 of the log streams, the checkpoint pages 950 may be stored as extents of the extent store instance being logged without relying on that extent store instance's metadata, i.e., without using slots in the hash tables of that extent store instance to locate the checkpoint pages on SSD. Illustratively, an index table 960 having index entries 962 are stored in the checkpoint file 940, e.g., at a known offset. The index entries 962 may locate, e.g., as offsets, the checkpoint pages 950 in the checkpoint file 940. In alternate embodiments, the checkpoint may include any number of hash tables up to the entire in-core hash table set 860.

Hash Table Recovery

As noted, it may be desirable to place the extent metadata into condition to begin satisfying I/O (read) requests from the volume layer promptly (i.e., after one second) upon reboot. Such low recovery time may be achieved by retrieving all (e.g., 256) of the log streams 920 from SSD within the reboot time threshold, e.g., one second. Once the log streams are read into memory, they may be reverse applied, i.e., in reverse chronological order, to the hash tables, entry by entry (i.e., the hash table slots recorded in the log stream pages). This recovery process may be used to restore (i.e., fully populate) the hash tables without checkpoints. However, without checkpointing (and retiring of log entries), the log streams may grow sufficiently large so that the reboot time to service exceeds the desired threshold. That is, eventually the random updates (i.e., changes to the hash table slots) that are converted into sequential updates of the log stream (i.e., the log stream pages) grow so large that the number of sequential updates adversely affects the reboot time to service. At that point the hash table may be checkpointed (e.g., written to SSD) so that all the log entries up to that point can be discarded (i.e., retired), thereby maintaining the reboot time to service under the desired threshold.

In an embodiment, frequency of hash table checkpoints may be based on the associated log stream size. That is, a checkpoint may be initiated when the log stream exceeds a certain size or number of entries. In another embodiment, the frequency of hash table checkpoints may be based on a metadata efficiency (i.e., change) threshold. For example, in a traditional file system, a single byte change to metadata may result in writing an entire 4 KB block to disk, which yields a mere 0.4% metadata efficiency (i.e., 1 byte out of 4096 bytes). In contrast, the storage I/O stack 300 may realize a metadata efficiency of, e.g., 10%, because changes (i.e., updates) can be accumulated in-core prior to checkpointing. In other words, the checkpoint pages 950 may include 10% changes to metadata (i.e., the hash table slots included in the checkpoint pages) thereby yielding a 10% metadata efficiency. In an embodiment, when a hash table 850 is at least 10% dirty (i.e., 10% of the slots 830 have been updated), the entire hash table may be written out to SSD (i.e., checkpointed) in accordance with a fuzzy checkpointing technique. Once entirely written to SSD, the hash table on SSD (i.e., the checkpoint pages 950) represents a "clean" version of the metadata and a new log stream may be associated with the hash table. During reboot, the log stream can be retrieved and reconciled with the new hash table (i.e., checkpointed hash table) on SSD. Notably, an in-progress checkpoint may be discarded (i.e., abandoned) and not used for recovery, if it is incomplete when a reboot of the node occurs.

During reboot of the node (i.e., within the reboot time threshold), each log stream may be read from SSD and its contents may be patched with, i.e., applied to, the contents of the respective in-core hash table. Accordingly, the in-core hash table may need to be reconciled with the checkpointed version of the hash table on SSD so as to recover a consistent point-in-time version of that hash table. Such a reconciliation period may be part of an overall recovery process, but may take longer than the reboot time threshold, (e.g., one second) and may occur on a demand basis. That is, because the size of the checkpoint (i.e., checkpoint pages 950 of one or more hash tables 850) is sufficiently large that to read the entire checkpoint into memory would take longer than one second, reconciliation (i.e., recovery of the hash tables) may occur on a demand basis until all the hash tables are fully recovered. Accordingly, the log stream may be read first and then the hash table may be demand filled (and reconciled) on a page-by-page basis as I/O requests are received by the extent store layer. As a result, the node may experience degraded performance during the reconciliation period, e.g., the first 15-30 seconds after reboot, because there are two SSD accesses for every I/O request: one SSD access to fetch the associated checkpoint page from the checkpoint file and another SSD access to perform the I/O request. Therefore, for that limited time period (i.e., the reconciliation period), the node may have a degraded performance, e.g., 50%.

It should be noted that the node may not service I/O requests during the time it takes to read the log streams during reboot, because the logs are not laid out in a way that allows for demand, i.e., immediate, random access to log entries that may be relevant without reading the entire log, i.e., the relevant entries may be anywhere in the log. In contrast, the checkpoint file can be accessed randomly (i.e., using the index structure 960) by simply reading the portion of the hash table (i.e., the checkpoint page including that portion of the hash table) to which access is desired. The size of each log may be determined based upon the time to complete reading of the entire log so as to satisfy the reboot time threshold. Note also that the longer the log read time, the larger the logs, which may reduce write amplification related to checkpoint activity. That is, the longer (i.e., larger in size) the log, the less frequent checkpoints are required as the log may record updates in lieu of checkpointing.

Accordingly, the frequency, i.e., rate, of checkpoints of a hash table may be proportional to an allocated size for the associated log stream. For example, if the size of all log streams for a node is reallocated from 10% to 20% of the overall node hash table size, the frequency of checkpoints is cut in half resulting in half the amount of checkpoint pages written to SSD. Note that as storage capacity of a node grows, the size of the hash table grows such that for a given amount of log I/O activity that can be performed within a given period (e.g., an allotted log I/O bandwidth), the fraction of the hash table that can be logged is cut in proportion to the growth of the hash table, e.g., doubling the size of the hash table cuts in half the fraction of the hash table that can be logged for a given amount of log I/O permitted within the period. As such, the storage bandwidth of a node (e.g., 6 GB/sec) may be allotted among logging, checkpointing and host I/O requests (e.g., 2 GB/s, 3 GB/s, and 1 GB/s respectively) so as to collectively meet the respective determined reboot time threshold, reconciliation period, and host I/O request performance (e.g., I/Os per second).

In another embodiment, the hash table set may be maintained in a non-volatile store to reduce or eliminate checkpointing. The non-volatile store may be an extension to memory, such as storage class memories (SCM), configured to store extent metadata so as to avoid the checkpointing overhead in SSD. It may still be desirable to log and checkpoint in SSD for recoverability purposes, but that activity may occur at lower frequency if normal recovery retrieves the extent metadata from SCM.

Fuzzy Checkpointing

As described above, in an embodiment, the hash tables are written to SSD using a fuzzy checkpointing technique wherein the contents of a given checkpoint (i.e., the hash tables) are not directly useable (i.e., not point-in-time consistent) without applying recent log entries from the log streams (i.e., updates occurring during the checkpoint). This is because as the checkpoint is written to SSD, updates (i.e., changes) may occur to portions of the hash tables (i.e., hash table slots 830) not yet written (i.e., checkpoint pages 950) to SSD. Rather than representing a single point in a log stream chronologically (i.e., a point-in-time), the checkpoint represents a range of points in the log stream, so that the checkpoint is not point-in-time consistent. Accordingly, reconciliation with updates recorded in the log stream may be required to recover a point-in-time version of the hash table, as previously described. Illustratively, only whole checkpoints are used in reconciliation, i.e., a checkpoint that is partially (or not) written is not used for recovery of hash tables. As a result, it may be necessary to apply multiple log streams during reconciliation.

Figure 10:
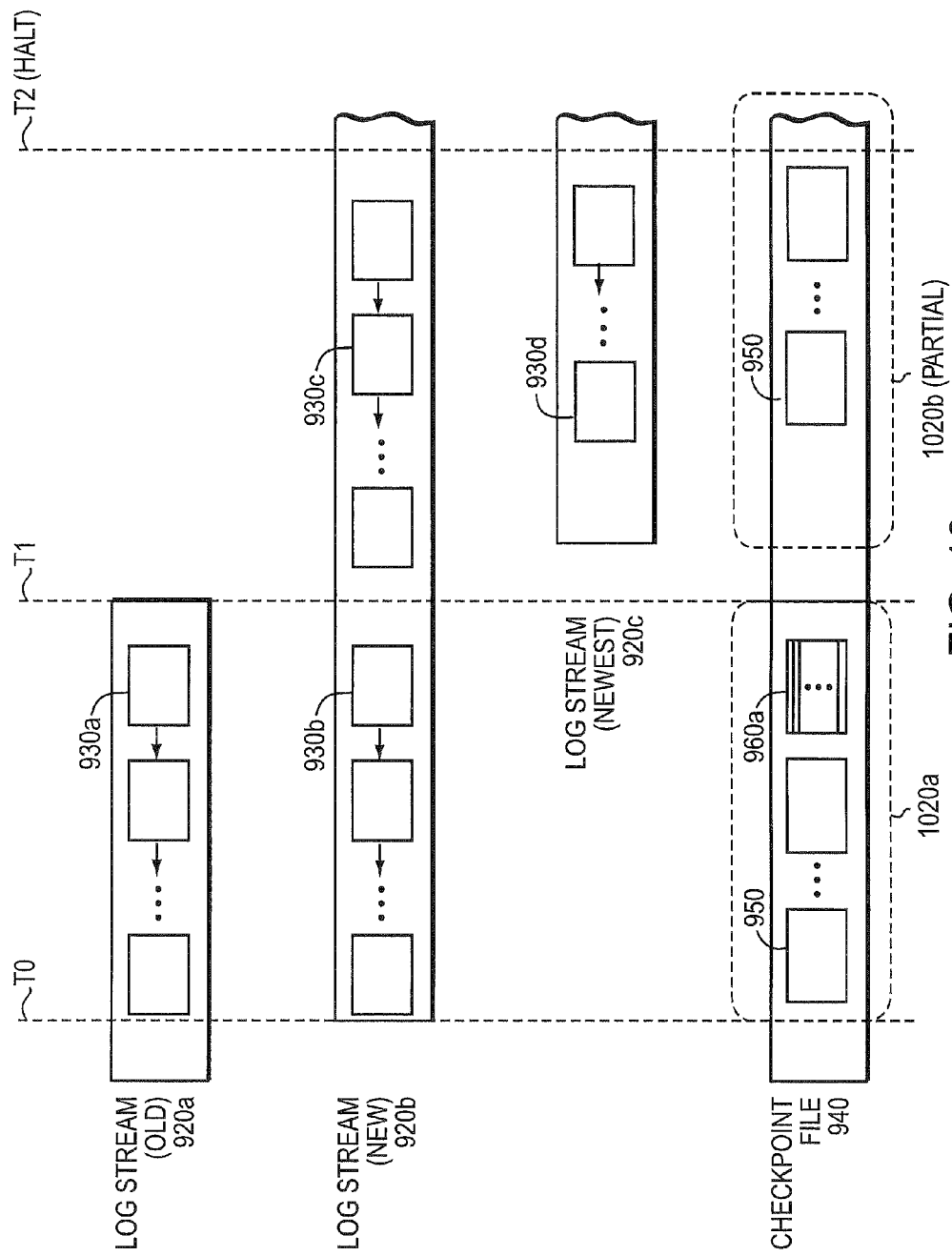
FIG. 10 illustrates a hash table log stream association to a hash table checkpoint.

FIG. 10 illustrates a hash table log stream association with a hash table checkpoint. Illustratively, a first (old) checkpoint 1020*a* (i.e., including checkpoint pages 950 and an index structure 960*a*) may be written to the checkpoint file 940 starting at a time T0. While the checkpoint 1020*a* is being written, the storage I/O stack 300 may continue to process I/O requests that result in updates to the hash table 850 which are recorded to two log streams 920: "old" and "new." Both logs may have entries written to them during the checkpoint. Illustratively, a hash table update (i.e., change to the slot 830) may be written to the old log stream 920*a* when the update pertains to a portion of the hash table not yet checkpointed (i.e., a checkpoint page not yet written to SSD during the current checkpoint operation from time T0 to T1). A hash table update may be written to the new log stream 920*b* for a portion of the hash table already checkpointed (i.e., a checkpoint page already written to SSD during the current checkpoint operation from time T0 to T1). That is, the log stream pages of stream 920*b* may include hash table updates for slots already checkpointed (i.e., changes later than the checkpoint); whereas, the pages of log stream 920a may include hash table updates for slots not yet checkpointed (i.e., changes later than time T0, but earlier than completion of the checkpoint 1020a at time T1). In other words, live changes may continue to be stored in the hash table while it is written out to SSD (i.e., checkpointed). Once the checkpoint 1020a is written to SSD, the log stream pages of stream 920a may be discarded, because updates recorded in that log stream have been written to the checkpoint 1020a (i.e., during the checkpoint operation from T0 to T1).

In an embodiment, when a "new" checkpoint 1020b is begun after time T1, the new log stream 920b that was created for checkpoint 1020a becomes "old" for checkpoint 1020b, and a newest log stream 920c is new for checkpoint 1020b. Logging may be halted (e.g., a node crash) at a later time T2, before the checkpoint 1020b completes (i.e., a partial checkpoint). Illustratively, checkpoint 1020a is discarded as lacking index 960. Notably, the hash table may be recovered using checkpoint 1020a and, e.g., log stream pages 930b,c,d, which include portions of the hash table newer than in checkpoint 1020a.

It should be noted that during checkpointing, portions of the tables may need more log space (i.e., log stream pages) then they otherwise would need, due to possible recurring updates to the same hash table slots. In an embodiment, only a few of the log streams (i.e., the log streams of only a few hash tables of the hash table set 860) may be checkpointed at a time, so as to minimize the amount of outstanding metadata stored in the log. Log stream writes to SSD (e.g., writes to SSD of the log stream structure 910 in the NVlog) may be performed by rolling through the hash tables, thereby limiting the average amount of logged data per checkpoint. In a further embodiment, smoother checkpoint I/O may be realized by pipelining writes to the checkpoint file 940. Accordingly, a subset of the total metadata recorded in the log streams may be checkpointed so as to smooth the logging (i.e., writes to the log streams). Thus, the hash tables need not be checkpointed at once, but the checkpointing may be spread out over time slowly and evenly through the entire memory (i.e., through the hash table set 860 in-core). Notably, checkpointing of each hash table may occur at any time, since the hash tables are independent from one another. Note also that both the logging and checkpointing may be data driven (i.e., driven by updates): the logging may occur as updates are made to the hash tables, and the checkpointing may be initiated when a hash table reaches a level of change (i.e., 10% dirty slots).

Figure 11:
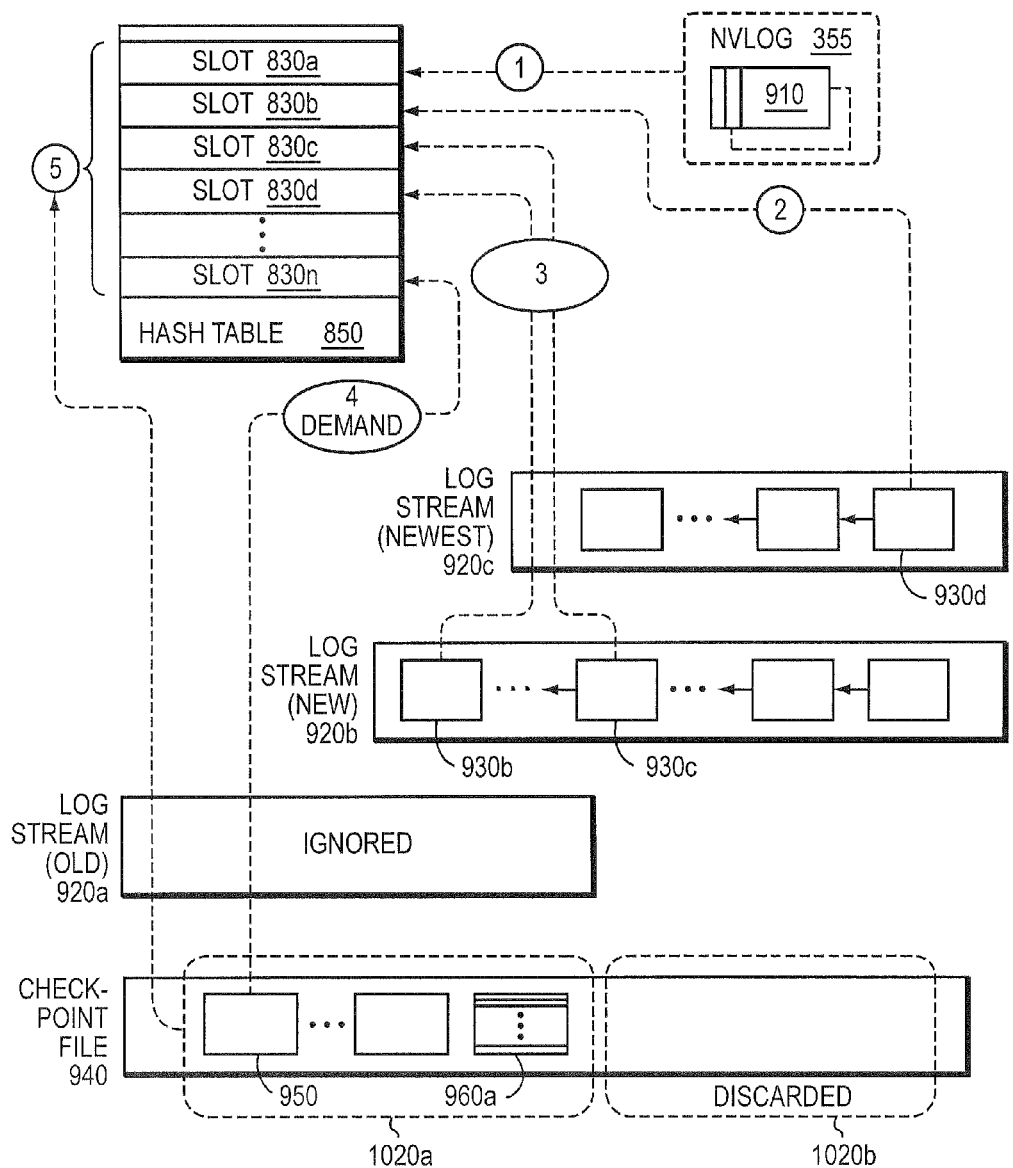
FIG. 11 illustrates recovery of a hash table.

FIG. 11 illustrates recovery of a hash table. In an embodiment, if a crash occurs during checkpointing, the new (i.e., in-progress) checkpoint 1020b that has been partially written may be ignored (i.e., discarded); the node may reboot with the prior checkpoint 1020a and may apply log stream pages from both the newest and new log streams 920, respectively, to the in-core hash table. This obviates the need to keep track of the locations (i.e., offsets to the checkpoint pages 950) of the new checkpoint as they are written out because those locations can be captured at the end of the checkpoint, i.e., the index table 960a may be written at the end of the checkpoint, once the checkpoint pages 950 have been written and their locations determined.

In an embodiment, changes may be applied to an empty hash table 850 in-core by first (1) applying any updates (i.e., changes to the hash table slots 830) stored in the extent store layer log 355 (i.e., entries 912 in log stream structure 910) as those updates have not yet been logged. Secondly (2), log stream page 930d from the newest log stream 920c (i.e., the new log for discarded checkpoint 1020b) may be applied as representing updates that occurred after the corresponding checkpoint page was written to the checkpoint 1020a. Thirdly (3), log stream pages 930c,b from the new log stream 920b also may be applied as representing updates that occurred after the corresponding page was written to checkpoint 1020a. Fourthly (4), the checkpoint page 950 from the checkpoint file 940 may be demand paged to fill any missing slot from the previous application of the log streams 920. Notably, the entries (i.e., updates to hash table slots) in the log stream pages may be applied in reverse chronological order (i.e., from most recent to oldest), so that if a hash table slot has already been recovered from a log stream, the next entry found for that same slot in the metadata in the log may be ignored. Fifth (5) and lastly, a background process may fill the hash table slots 830 from the checkpoint 1020a while slots are demand paged as described in (4) above.

As noted, the log streams may be found on SSD in a reverse order linked list, i.e., each time a new log stream page is written, a pointer to the previous log stream page is stored. Thus, during recovery, the log streams are read in reverse order using the location of the last log stream page written (i.e., the most recent), so that they can be applied in reverse order, most recent to oldest, to the in-core hash table.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving a write request, the write request having an extent, the write request processed at a storage system having a processor and a memory, the storage system coupled to one or more solid state drives (SSDs);
   applying a hash function to the extent to generate a table index;
   storing a portion of the table index in a first slot of a table, the table stored in the memory, the first slot including a location of the extent on the one or more SSDs;
   determining whether the first slot has been written to a first checkpoint; and
   in response to determining that the first slot has been written to the first checkpoint, recording the first slot in a first log, wherein the first log is written to the one or more SSDs.

2. The method of claim 1 further comprising:
   in response to determining that the first slot has not been written to the first checkpoint, recording the first slot in a second log, and wherein the second log is written to the one or more SSDs.

3. The method of claim 2 wherein the first log and the second log are applied in reverse chronological order during recovery of the table.

4. The method of claim 2 further comprising:
   writing an index table to the first checkpoint, the index table including a location of a page having the first slot on the one or more SSDs, thereby completing the first checkpoint; and
   initiating a second checkpoint.

5. The method of claim 4 further comprising:
rebooting the storage system;
creating a hash table in the memory, wherein the hash table is initially empty;
applying the first slot recorded in the first log to the hash table; and
apply a second slot recorded in the second log to the hash table.

6. The method of claim 5 further comprising:
demand paging a third slot recorded to the first checkpoint to the hash table.

7. The method of claim 1 further comprising:
initiating the first checkpoint when a size of the first log exceeds a size threshold.

8. The method of claim 1 further comprising:
initiating the first checkpoint when a number of dirty slots in the table exceeds a change threshold.

9. The method of claim 1 wherein the one or more SSDs comprise flash storage devices.

10. The method of claim 9 wherein the first and second slots are applied to the hash table before demand paging the third slot to the hash tables.

11. A non-transitory computer readable storage medium containing executable program instructions for execution by a processor at a storage system having a memory, the storage system coupled to one or more solid state drives (SSDs), comprising program instructions that:
receive a write request, the write request having an extent;
apply a hash function to the extent to generate a table index;
store a portion of the table index in a slot of a table, the table stored in the memory, the slot including a location of the extent on the one or more SSDs;
determine whether the slot has been written to a checkpoint;
in response to determining that the slot has been written to the checkpoint, record the slot in a first log, wherein the first log is written to the one or more SSDs, wherein the first log is organized in reverse chronological order; and
in response to determining that the slot has not been written to the checkpoint, record the slot in a second log, wherein the second log is written to the one or more SSDs, wherein the second log is organized in reverse chronological order.

12. A storage system having a memory connected to a processor via a bus, the storage system comprising:
a storage array coupled to the storage system and having one or more solid state drives (SSDs);
a storage I/O stack executing on the processor of the storage system, the storage I/O stack when executed operable to:
receive a write request, the write request having an extent;
apply a hash function to the extent to generate a hash table index and a hash table selector;
select a cuckoo table from a plurality of cuckoo tables in the memory;
store a portion of the hash table index in a slot of the selected cuckoo table, the slot including a location of the extent on the one or more SSDs;
determine whether the slot has been written to a first checkpoint; and
in response to determining that the slot has been written to the first checkpoint, record the slot in a first log, wherein the first log is written to the one or more SSDs.

13. The storage system of claim 12 wherein the storage I/O stack when executed is further operable to:
in response to determining that the slot has not been written to the first checkpoint, record the slot in a second log, and wherein the second log is written to the one or more SSDs.

14. The storage system of claim 12 wherein the storage I/O stack when executed is further operable to:
initiate the first checkpoint when a number of dirty slots in the cuckoo table exceeds a change threshold.

15. The storage system of claim 12 wherein the one or more SSDs comprise flash storage devices.

16. The storage system of claim 13 wherein the first log and the second log are organized in reverse chronological order.

17. The storage system of claim 16 wherein the storage I/O stack when executed is further operable to:
write an index table to the first checkpoint, the index table including a location of a page having the slot on the one or more SSDs, thereby completing the first checkpoint; and
initiate a second checkpoint.

18. The storage system of claim 17 wherein the storage I/O stack when executed is further operable to:
reboot the storage system;
create a hash table in the memory, wherein the hash table is initially empty;
demand page the slot recorded to the first checkpoint to the hash table; and
service a read request using the hash table.

19. The storage system of claim 18 wherein the storage I/O stack when executed is further operable to:
apply the first log to the hash table; and
apply the second log to the hash table, wherein the first log is applied before the second log is applied.

20. A storage system having a memory connected to a processor via a bus, the storage system comprising:
a storage array coupled to the storage system and having one or more solid state drives (SSDs);
a storage I/O stack executing on the processor of the storage system, the storage I/O stack when executed operable to:
receive a write request, the write request having an extent;
apply a hash function to the extent to generate a hash table index and a hash table selector;
select a cuckoo table from a plurality of cuckoo tables in the memory;
store a portion of the hash table index in a slot of the selected cuckoo table, the slot including a location of the extent on the one or more SSDs;
determine whether the slot has been written to a checkpoint;
in response to determining that the slot has been written to the checkpoint, record the slot in a first log, wherein the log is written to the one or more SSDs, wherein the log is organized in reverse chronological order; and
write an index table to the checkpoint, the index table including a location of a page having the slot on the one or more SSDs.

* * * * *